H. KINNEL.
MOTOR VEHICLE.
APPLICATION FILED AUG. 22, 1914.
1,154,321.
Patented Sept. 21, 1915.
2 SHEETS—SHEET 1.
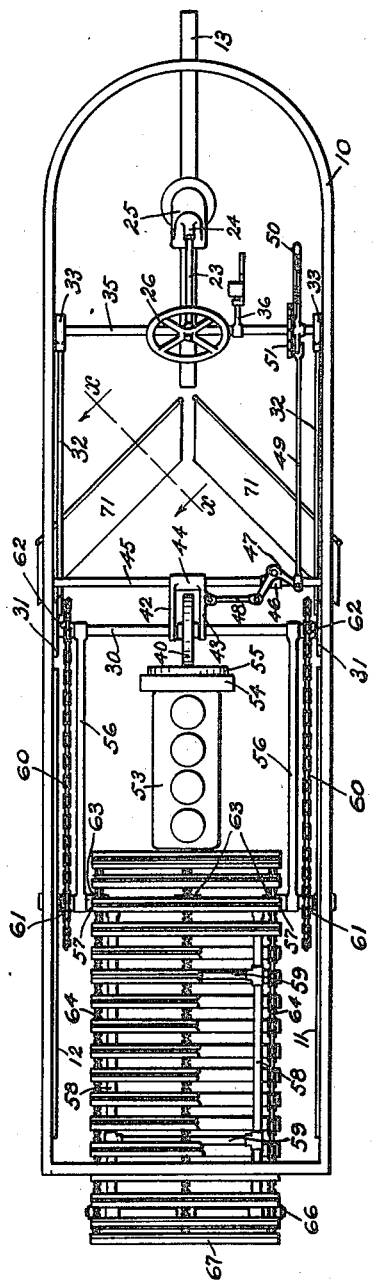
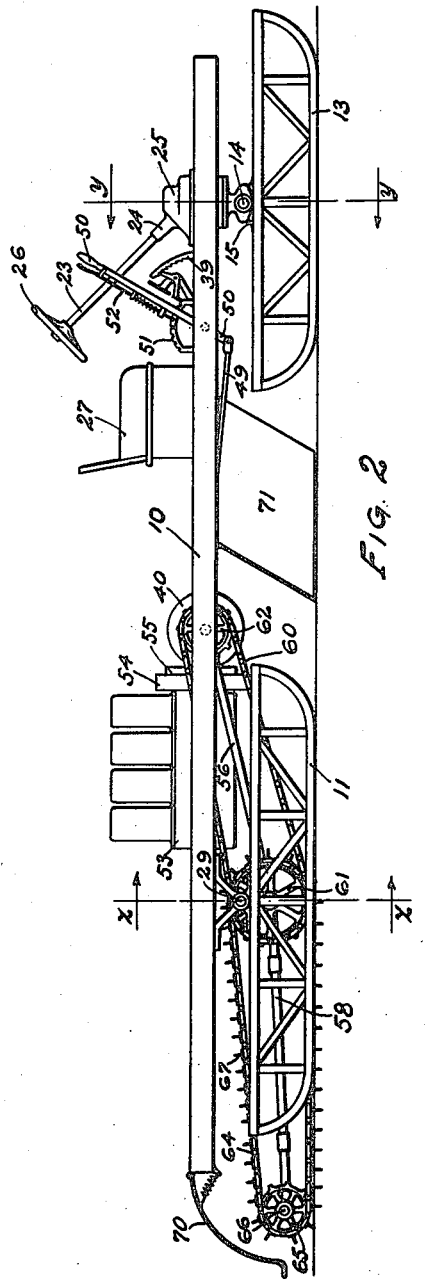
WITNESSES:
O. Johnson
Frank Warren
INVENTOR
Henry Kinnel
BY
C. D. Haskins
ATTORNEY H. KINNEL.
MOTOR VEHICLE.
APPLICATION FILED AUG. 22, 1914.
1,154,321.
Patented Sept. 21, 1915.
2 SHEETS—SHEET 2.
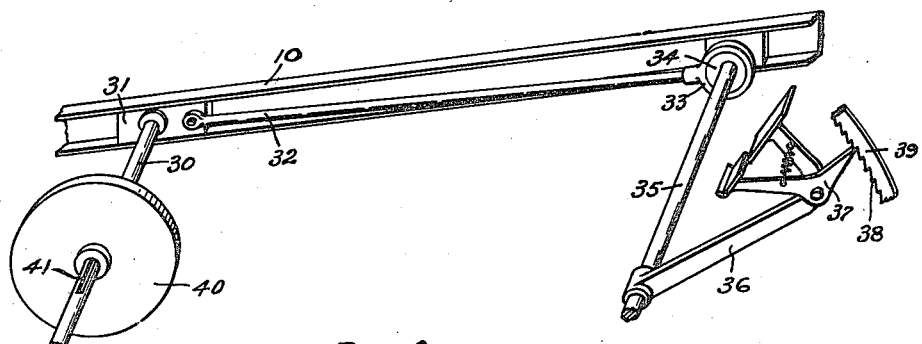
FIG. 3
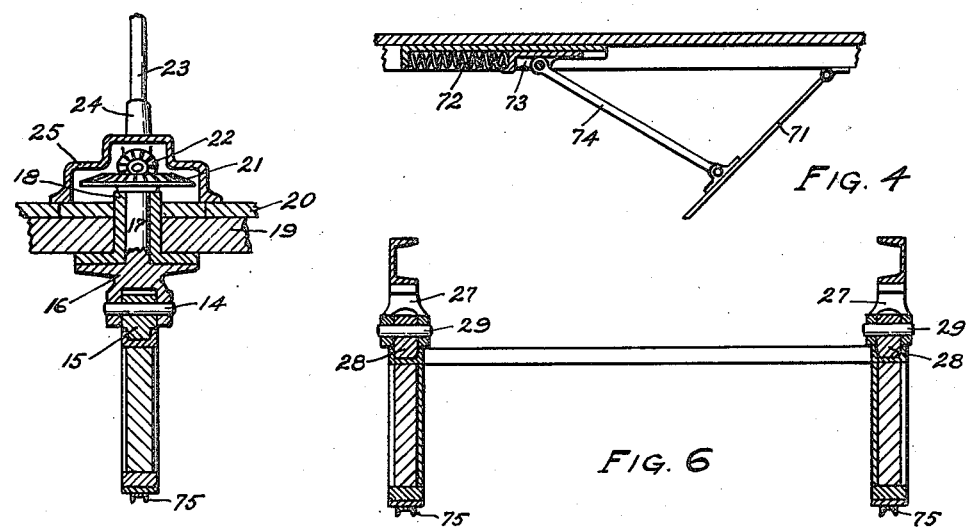
FIG. 4
FIG. 5
FIG. 6
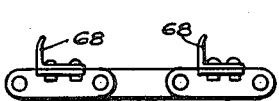
FIG. 7
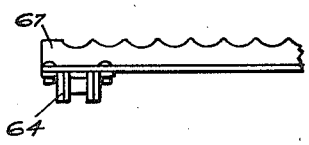
FIG. 8
FIG. 9
WITNESSES:
O. Johnson
Frank Warren
INVENTOR
Henry Kinnel
BY
C. D. Haskins
ATTORNEY

UNITED STATES PATENT OFFICE.

HENRY KINNEL, OF SEATTLE, WASHINGTON.

MOTOR-VEHICLE.

1,154,321. Specification of Letters Patent. Patented Sept. 21, 1915.

Application filed August 22, 1914. Serial No. 858,010.

*To all whom it may concern:*

Be it known that I, HENRY KINNEL, citizen of the United States, residing at Seattle, in the county of King and State of Washington, have invented a certain new and useful Improvement in Motor-Vehicles, of which the following is a specification.

My invention relates to improvements in power propelled vehicles which may be adapted to travel when supported either on sliding runners like a sled, or on wheels like a wagon, and the object of my improvement is to provide a vehicle propelling mechanism which may be pivotally attached to the body-frame of a vehicle to extend rearwardly and be free to swing downwardly to engage its moving parts with the road-bed over which the vehicle is to travel, such propelling mechanism being actuated by a suitable motor, as for instance, a gasolene engine or an electric motor operated by storage battery, which motor may be fixed on the body-frame of the vehicle, the weight of such motor together with the weight of the body-frame and of the load carried thereon being directly supported by the sled-runners or the wheels of the vehicle independently of such propelling mechanism, and a further object of my improvement, in cases where it is applied to vehicles which are supported on sled-runners that are to be used in traveling in the deep snow of an unbroken trail, is to provide means associated with the body of the vehicle whereby the soft snow of an unbroken trail may be forced sidewise out of the path or pressed downwardly and compactly to form a more solid road-bed. I attain these objects by devices illustrated in the accompanying drawings wherein—

Figure 1 illustrates a motor vehicle embodying my invention by a plan view in which some of the parts are shown as broken away more clearly to disclose other parts; Fig. 2 is a view in side elevation of the same; Fig. 3 is a view in perspective of certain associated details; Fig. 4 is a view in vertical section on broken line $x$, $x$ of Fig. 1; Fig. 5 is a view in vertical mid-section on broken line $y$, $y$ of Fig. 2; Fig. 6 is a view in vertical cross-section on broken line $z$, $z$ of Fig. 2, showing some parts of the structure; and Figs. 7, 8, and 9 are views in side elevation illustrating certain details of my invention.

Referring to the drawings, throughout which like reference numerals indicate like parts, 10 is the body-frame of a vehicle with its floor removed better to disclose the operative parts of the vehicle, such body-frame 10 being pivotally mounted on three sled runners 11, 12 and 13, the forward end portion being supported on the one sled runner 13 through the medium of a universal joint comprising a bracket 15 mounted on the top rail of the runner 13, a pivot 14 and a swivel 16 that is provided with a shank 17 which extends upwardly to project through a flanged sleeve 18 in and extending upwardly through the floor beam 19 and floor 20, as shown more clearly in Fig. 5, there being mounted on the upwardly projecting end of said shank 17 a beveled gear wheel 21 which meshes with another beveled gear wheel 22 which is mounted on the end of the shaft 23 which is disposed to be rotatable in the sleeve portion 24 of a housing 25 that is secured to the floor 20 whereby the runner 13 may be turned in a horizontal plane to assume any angular direction with respect to the body-frame 10 thus to guide the travel of the vehicle, there being a steering wheel 26 fixed on the end of the shaft 23 which extends obliquely rearward toward a driver seat 27, as more clearly shown in Figs. 1 and 2; while the rear end portion of the body-frame 10 is hinged to the runners 11 and 12 by means of hinge brackets 27 and 28 which are articulated by hinge pins 29.

Extending between the side rails of the body-frame 10 is a shaft 30 whose end journals are disposed to rotate in slidable bearing blocks 31 which are adapted to slide backwardly and forwardly in the channel-ways formed in the inner sides of the body-frame 10, which backward and forward movements may be accomplished by the simultaneous endwise movements of two connecting rods 32 the rear ends of which are pivotally connected respectively with said bearing blocks 31 while their forward ends are connected to eccentrics 33 each of which is disposed on an eccentric disk 34 which is fixed on a different end portion of a rotatable shaft 35 which is disposed to rotate in bearings secured to the body-frame 10, as shown more clearly in Figs. 1 and 3, there being mounted on the central portion of the said shaft 35 a foot lever 36 which is adapted to be moved by one's foot to rotate said shaft 35 whereby to move the connecting rods 32 endwise to communicate a sliding motion to the bearing blocks 31 whereby the shaft 30 may be moved backwardly in response to such movement of the foot lever 36 by one's foot and the vertical position of the lever 36 may be fixed and maintained at any desired point by a locking arm 37 which is pivotally attached to the foot lever 36 in such manner that it may be actuated by one's heel to release it from engagement with the teeth 38 provided on a segmentally formed arm 39 fixed to the floor of the vehicle, as more clearly shown in Fig. 2.

On the central portion of the shaft 30 is mounted a friction wheel 40 which is adapted to be slidably moved in a lengthwise direction of said shaft 30 but which is fixed in its circumferential position with relation thereto by means of a longitudinal slot 41 which extends along the central portion of said shaft 30 and into which slot 41 projects a feather, not shown, which extends from the inner surface of the boring of said friction wheel 40, and said friction wheel 40 may be actuated to slide sidewise on said shaft 30 by means of two arms 42 and 43 disposed to engage each with a different one of the surfaces of the hub of the friction wheel 40, as more clearly shown in Fig. 1, said two arms 42 and 43 being integrally connected with a sleeve 44 which is slidably mounted on a fixed transverse bar 45 which is secured to extend between the side rails of the body-frame 10, and mounted securely on said transverse bar 45 is a bracket 46 upon which is pivoted a bell crank 47 one arm of which is articulated with a link 48 which link 48 is articulated with the arm 43 whereby a movement of said bell crank 47 may cause the arms 42 and 43 with the sleeve 44 to move sidewise and carry with it the friction wheel 41. The other arm of the bell crank 47 is articulated with the rear end of a connecting rod 49 whose forward end is articulated with a hand lever 50 which is pivotally attached to the body frame 10 there being associated with said hand lever 50 a locking mechanism comprising a notched segmental bracket 51 fixed to the body-frame 10 in such position that any desired one of its notches may engage with a spring and hand actuated locking arm 52 which is associated with said hand lever in a manner well known, whereby said hand lever may be released and moved to a desired angular position and then locked in such position in the operation of moving the friction wheel 40 sidewise to a desired point.

Mounted upon the vehicle I have indicated a motor 53 provided with a fly wheel 54 which is mounted on a shaft not shown, which shaft extends in a lengthwise direction of the vehicle and on said shaft adjacent to said fly wheel 54 is a friction wheel 55 which revolves in a plane at right angles to the plane of the friction wheel 40 which is disposed so that its periphery may engage with the side surface of the friction wheel 55 whereby when the friction wheel 40 is disposed with its periphery against the center of the side of the friction wheel 55, as shown in Fig. 1, then in such case a rotary motion of the friction wheel 55 will communicate no motion to the friction wheel 40, but if the hand lever 50 be moved to change the position of the friction wheel 40, from its central position on the shaft 30, then a rotation of the friction wheel 55 will rotate the friction wheel 40 provided the foot lever 36 is in a position to force such friction wheel 40 against the side surface of the friction wheel 55. Obviously, if the friction wheel 55 is revolving in a given direction then the direction of rotation of the friction wheel 40 will depend upon which side of the center of the side surface of the friction wheel 55 the periphery of the friction wheel 40 engages with the friction wheel 55, and, therefore, by operating the hand lever 50, although the friction wheel 55 be revolving in a constant direction, the friction wheel 40 may be caused to revolve in a desired direction, or it may be brought to rest, or it may be caused to reverse its direction of rotation as may be desired.

Near each of the opposite end portions of the shaft 30 is articulated to swing freely thereon a connecting rod 56 each of which connecting rods 56 is articulated with a shaft 57 which is disposed transversely of the vehicle and rotatably mounted in bearings secured to the front end of a rectangular frame comprising side rails 58 and cross-connecting rails 59 which rectangular frame is thus adapted freely to move downwardly and upwardly toward and away from the road-bed over which the vehicle is to travel, and such shaft 57 is adapted to be rotated by sprocket chains 60 which are disposed between and run on sprocket wheels 61 and sprocket wheels 62 the sprocket wheels 61 each being mounted securely on one of the opposite end portions of the shaft 57 while the sprocket wheels 62 are each mounted on opposite end portions of the shaft 30. And also securely mounted on said shaft 57 at equi-distant points between the connecting rods 56 are three sprocket wheels 63 around and on which are disposed to run three sprocket chains 64 which extend rearwardly to engage with and run on three other sprocket wheels 65, respectively, which three other sprocket wheels 65 are all mounted at corresponding equi-distant points on a shaft 66 which is mounted in suitable bearings on the rear end portion of said rectangular frame whereby the shafts 57 and 66 will both revolve in response to a travel of the sprocket chains 60 which move in response to a rotation of the friction wheel 41.

The three sprocket chains 64 are all connected together by a plurality of transverse bars 67 whose cross-section may be of the shape of an inverted letter T, as indicated in Fig. 7, or they may be of annular shape in cross-section, as shown by cross-bars 68 indicated in Fig. 8, such cross-bars 67 being riveted to adjacent alternate links 69 as shown in Fig. 7, in which positions they serve to form a propelling device of caterpillar form which may engage with a road-bed to move the vehicle over such road-bed in response to a rotation of the sprocket wheels 63 and 65, the engaging edges of said cross-bars 67 being serrated in a suitable manner, as, for instance, in the manner indicated in Fig. 9 wherein is shown a fragment of one of the cross-bars 67 by view in side elevation. Obviously, in a vehicle of such construction the caterpillar-like propelling device is free and independent in its vertical movement with relation to the body-frame 10 and the runners 11, 12 and 13 whereby in traveling over a road-bed covered with deep snow the depth to which such runners may be depressed into the snow will have no relation as to the depth to which the caterpillar-like propelling device by its own weight may dig its way downwardly to a sufficiently solid road-bed with which it may engage in the operation of propelling the vehicle.

On the rear end of the body-frame 10 I have provided a pivotally attached curved deflector 70, as indicated in Fig. 2, but which is not shown in Fig. 1, which deflector 70 may extend transversely throughout the width of the body-frame 10 and which may serve to prevent snow or dirt from being thrown upwardly over onto the body of the vehicle, but such deflector 70 in many cases may be dispensed with.

Swingingly attached to the underside of the body-frame 10 in front of the runners 11 and 12 are deflecting boards 71 which are disposed to form an angle whose apex projects toward the front end of the vehicle, which deflecting boards, like the deflecting board 71, indicated in Fig. 4, are adapted normally to be pressed downwardly by a spiral compression spring 72 which acts through the medium of a slidable member 73 which is articulated with a brace bar 74 which pivotally connects with the lower portion of the deflecting board 71, the slidable member 73 being suitably secured in guides attached to the body-frame 10, and such deflecting boards 71 serve to compact the soft snow into a solid road-bed or force it outwardly on opposite sides of the vehicle when such vehicle is traveling over deep soft snow.

The runners 11, 12 and 13 may be preferably of considerable width to prevent the vehicle from sinking too deeply into the snow and as shown in Fig. 6, there are disposed on the bottoms of said runners 11, 12 and 13, to extend lengthwise thereof, bars 75 of channel iron whose downwardly projecting edges may serve to prevent the vehicle from skidding sidewise when such vehicle is traveling over a hard smooth road-bed.

Obviously, wheels may be substituted for the runners 11, 12 and 13 and many changes may be made in the form and arrangement of various other parts of my invention without departing from the spirit thereof.

What I claim is:—

1. In a motor vehicle of the class described, the combination with a vehicle body, of a caterpillar-like propelling device disposed beneath said vehicle body and articulated therewith in a manner to adapt such propelling device to engage with a road-bed at all times irrespective of changes in the distance between said road-bed and the said vehicle body, said propelling device embodying a rectangular frame, two shafts rotatably mounted on said frame and adapted to maintain uniform spacing irrespective of the relative heights of said shafts from a horizontal plane, a plurality of sprocket wheels mounted at equidistant and corresponding points on each of said shafts, sprocket chains disposed each to engage with and travel on corresponding ones of the sprocket wheels of said two shafts, a plurality of cross-bars extended crosswise of said sprocket chains and parallel with and near each other, said cross-bars being each secured to corresponding links of each of said sprocket chains and each having an outwardly projecting portion that is adapted to penetrate and engage with a road-bed, a motor disposed on said vehicle body, and controllable means for transmitting rotary motion from said motor to said sprocket wheels of said propelling device.

2. A motor vehicle of the class described which embodies a motor mounted on the body of said vehicle, a propelling mechanism disposed beneath the body of said vehicle, connecting rods each having one of its ends articulated with the bottom of the body of said vehicle while each of their other ends is articulated with said propelling device and controllable means for communicating motion from said motor to the movably operative parts of said propelling mechanism.

3. In a motor driven sled, runners and a body, and a propelling device embodying a rectangular frame, a pair of shafts rotatably-mounted on said frame and adapted to maintain uniform spacing irrespective of the relative heights of said shafts from a horizontal plane, sprocket wheels on said shafts, sprocket chains engaging the wheels on said shafts, cross bars extending crosswise of the sprocket chains parallel with each other, said cross-bars being secured to corresponding links of the sprocket chains and having outwardly-projecting portions adapted to penetrate and engage with a road-bed, and driving means for said sprocket wheels.

In witness whereof, I hereunto subscribe my name this fifth day of August A. D., 1914.

HENRY KINNEL.

Witnesses:
A. HASKINS,
FRANK WARREN.